United States Patent

[11] 3,630,136

[72] Inventor Kiyoshi Kitai
     Tokyo, Japan
[21] Appl. No. 834,331
[22] Filed June 18, 1969
[45] Patented Dec. 28, 1971
[73] Assignee Kabushiki Kaisha Hattori Tokeiten
     Tokyo, Japan
[32] Priority June 19, 1968
[33] Japan
[31] 43/42169

[54] EXPOSURE TIME ADJUSTING DEVICE FOR ELECTRIC SHUTTERS
     6 Claims, 4 Drawing Figs.
[52] U.S. Cl. ............................................. 95/53 R
[51] Int. Cl. ............................................. G03b 9/00
[50] Field of Search ............................. 95/53, 53.3, 62, 58

[56] References Cited
     UNITED STATES PATENTS
     2,523,660  9/1950  Hulstein ................... 95/53 X
     3,418,904  12/1968  Wick ....................... 95/53 X
     3,511,157  5/1970  Eloranta ................... 95/53
     FOREIGN PATENTS
     756,358  4/1967  Canada ..................... 95/53

Primary Examiner—Samuel S. Matthews
Assistant Examiner—Monroe H. Hayes
Attorneys—Robert E. Burns and Emmanuel J. Lobato ABSTRACT: A shutter apparatus having an electrical timing circuit for controlling the open time of the shutter has an adjustable linkage in the shutter drive mechanism. The starting position of the shutter may be varied in order to make the delay time in opening of the shutter equal to the delay time in closing of the shutter.

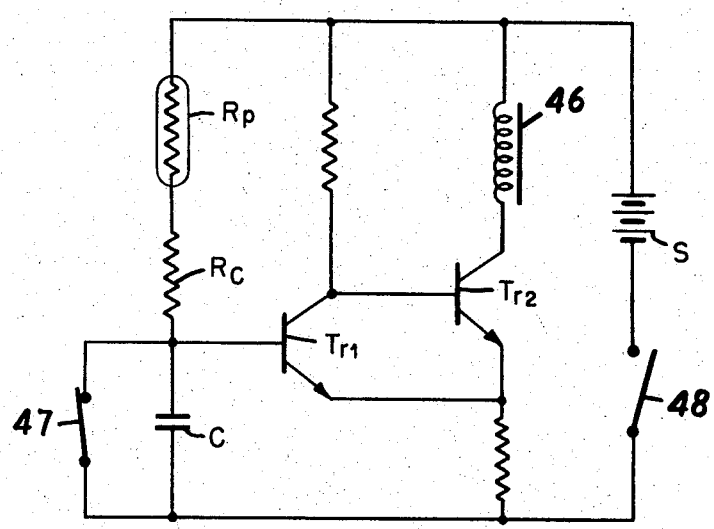
FIG. 2
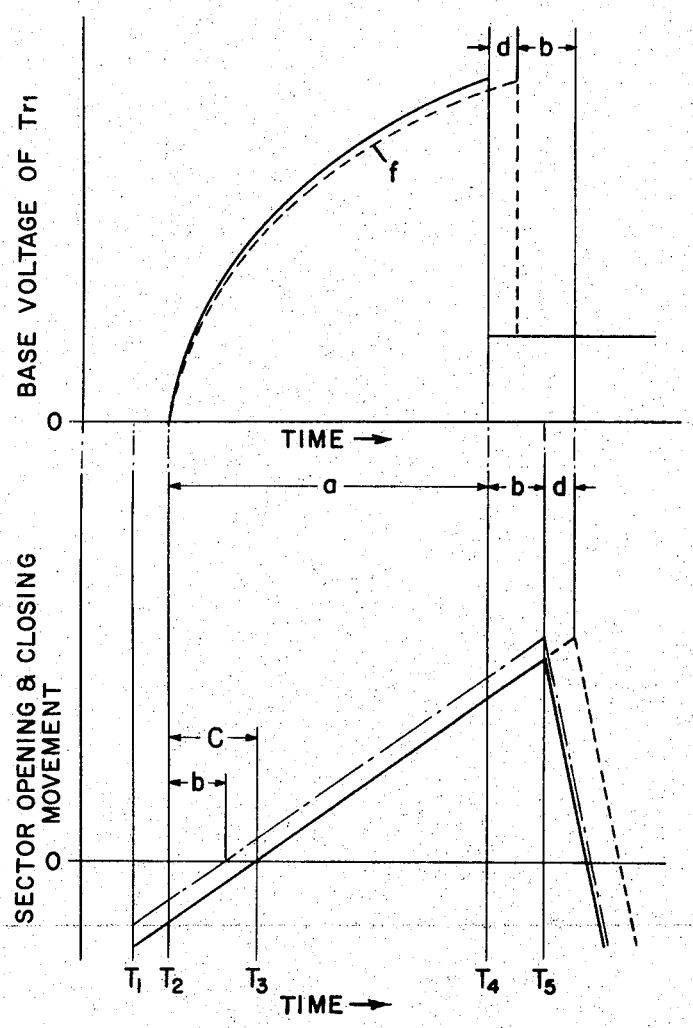
FIG. 3a
FIG. 3b 3,630,136

EXPOSURE TIME ADJUSTING DEVICE FOR ELECTRIC SHUTTERS

This invention relates generally to cameras and more particularly to electronically controlled shutters and exposure time adjusting devices for such shutter.

In electrically controlled shutters there is usually provided an electric delay circuit incorporating a timing switch which is actuated directly or indirectly by a trigger or release means in the form of a manually operable reciprocating lever. A small time delay will occur between the opening of the timing switch and the actual opening of the shutter blades to initiate an exposure operation. Moreover, where termination of the exposure is made automatically in response to detected brightness and is controlled by the delay circuit, there will be a further unavoidable delay between the occurrence of a change in the parameter of the delay circuit, which change actuates a shutter closing means, and the actual closure of the shutter. It is desirable that these delay times be brought into agreement, however individual shutters or shutter blades will vary to some degree and accordingly it is often not possible to obtain an exposure which is correct with respect to the detected brightness.

The present invention seeks to overcome the above disadvantages and according to the present invention, and exposure control mechanism for an electrically controlled photographic shutter comprises displaceable release means for opening the shutter, an actuatable timing switch for energizing an electric delay means, shutter closing means operable by the electric delay means, and adjusting means for adjusting the starting position of the shutter so as to alter the time interval between the actuation of the timing switch and the actual opening of the shutter, whereby the time interval may be adjusted to compensate for any time delay between the operation of the electric delay means and the actual closing the shutter.

Other features and advantages of the exposure time adjusting device in accordance with the present invention will be better understood as described in the following specification and appended claims, in conjunction with the following drawings in which:

FIG. 2, is a circuit diagram of circuitry in the device of FIG. 1;

FIG. 3a is a diagram illustrating the relation of a base voltage of a transistor in the circuit in FIG. 2 and the time lapsing due an electric delay circuit in FIG. 2; and FIG. 3b is a diagram illustrating the opening and closing of a sector of a shutter and the lapsing time.

Figure 1:
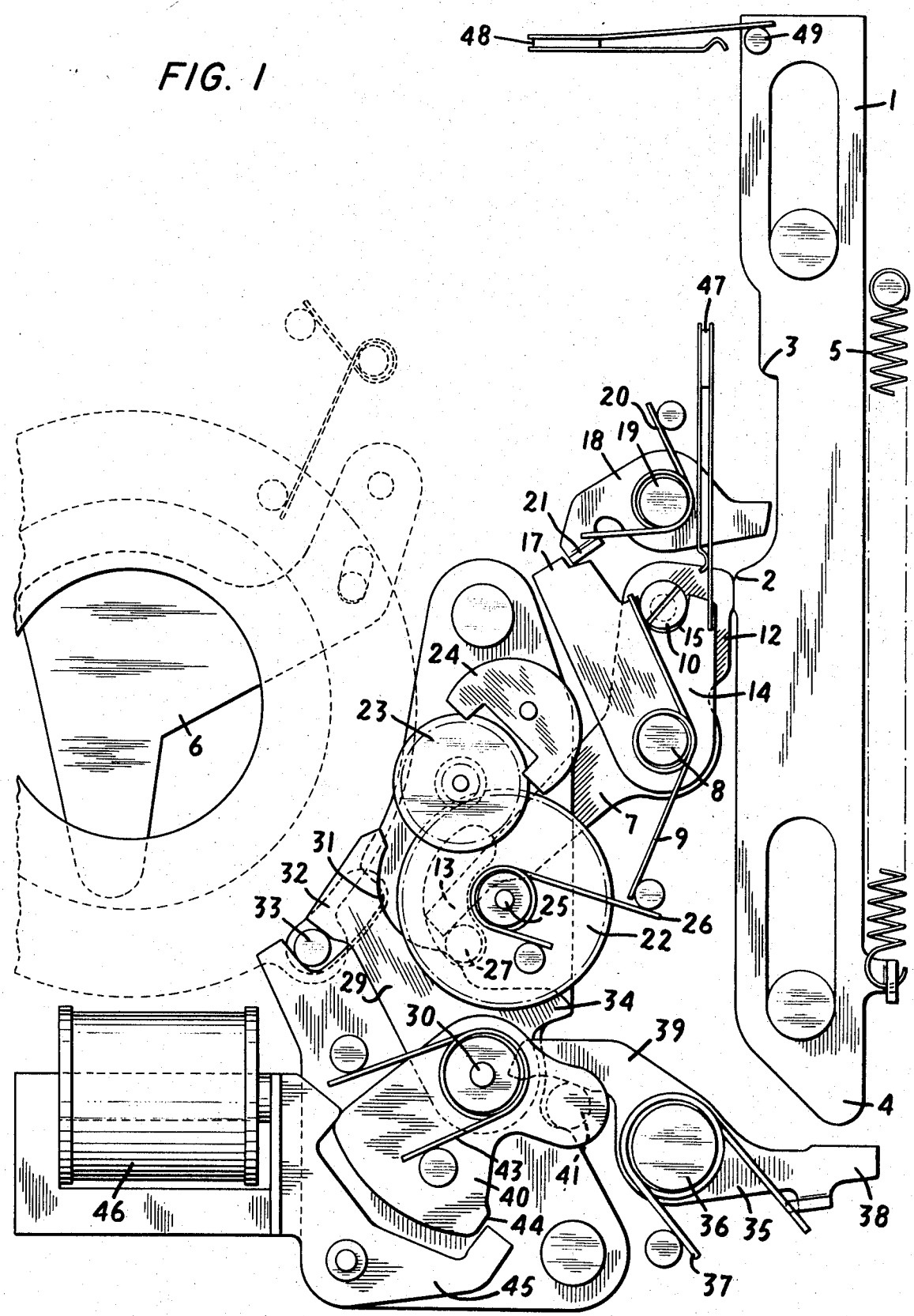
FIG. 1, is a front elevation view of an exposure time adjusting device according to the invention.

In electric shutters it is not possible to synchronize a shutter release time such as shown at $T_1$ on FIG. 3 during opening of an electric shutter, the release time of a timing switch of an electric delay means shown at time $T_2$, and a time $T_3$ a beginning of the actual opening of a sector or to adapt an interruption time $T_4$ of a magnet current in an electric delay means or circuit during its closing operation of a time $T_5$ of closing of a sector. In order to obtain a correct exposure it is required to synchronize a delay time C between the opening time $T_2$ of a timing switch of an electric delay means in the opening operation effecting an aperture and the time of opening of a sector with a delay time $b$ between the interruption time $T_4$ of a magnet current in a closing operation and the time $T_5$ corresponding to the closing of a sector or termination of an exposure.

To comply with the above requirement it has been the usual practice to employ a resistor $R_c$ corresponding to the time equivalent to $C=b=d$ in series with a CdS resistance $R_p$ as shown in FIG. 2 correcting a voltage curve illustrated in solid lines in FIG. 3a to a voltage curve shown by broken lines $f$. In actual shutter manufacture however, the described value $d$ varies with individual shutters which require correction and sometimes make the correction impossible, particularly at the time $b>C$.

The present invention is therefore intended to overcome the above-mentioned drawback and it provides an exposure time correction device for an electric shutter in which an electric delay means is actuated by operation of a switch when a sector starts to open effected by a release operation, wherein by adjusting a position of the sector before opening a time defined by the electric delay means and the opening and closing operation of the sector are brought into agreement.

An embodiment of the present invention will now be described in detail with reference to the drawing. A trigger or release lever 1 is guided by each pin in a groove as illustrated. The release lever 1 is for effecting an exposure and is movable upwardly and downwardly and is biased upwardly by a spring 5. The release lever 1 has a setting edge surface 2 to rotate a setting lever 7, a release projection to operate an engaging lever 18, an operative projection 4 opening a drive cam 40 for effecting closing a sector-closing operation, and a pin 49 for operating a power source switch 48.

The setting lever 7 is pivotally mounted on a shaft 8 and is biased in a clockwise direction by a spring 9. The setting lever 7 has a driven arm 12 in contact with a setting edge 2 of the release lever 1 and an operating arm 13 and also has an eccentric pin 10 mounted adjustably on a side and biased to rotate by an external force. A correction lever 14, loosely fitted to the shaft 8, has a groove 15 to which is fitted an eccentric pin 10. An engaging pawl 17 is formed on an edge thereof and when laid on a setting lever 7 the relative position of the two members is slightly adjusted by rotation of the eccentric pin.

An engaging lever 18 is pivotally mounted on a shaft 19 and is biased in a counterclockwise direction by a spring 20 and an engaging member 21 on the forward end of the lever 18 engages with the pawl 17 of the correction lever 14.

A first wheel 22 of a sector-opening control governor is mounted on a shaft 25 and is biased in a clockwise direction by a spring 26, meshing with a gear 23 having an anchor 24, and has on its under surface a pin 27 for controlling a ring lever 29. The pin 27 engages with an operating arm 13 of the setting lever 7.

The ring lever 29 is pivotally mounted on a shaft 30 one arm 32 of which engages with a pin 33 of a shutter ring to open or close a sector 6 and on the arm is formed a cam surface 31 engaging with the pin 27 of the first wheel 22. The other arm forms a driven arm 34 which a drive pin 41 of a drive cam 40 contacts and is mounted coaxially on a shaft 30 and biased in a counterclockwise direction by a spring 43. The drive cam 40 has a surface 44 engaging with an anchor 45 operated by an electromagnet 46. A setting lever 35 of the drive cam 40, is mounted on a shaft 36 and is biased in a counterclockwise direction by a tension spring 37. One arm of the setting lever 35 faces the operating projection 4 of the release lever 1 and the operating arm 39 or other arm engages with the drive pin 41 of the drive cam 40.

A delay circuit is provided for maintaining the shutter open a predetermined time period after actuation of a timing switch 47 which is opened by depression of a contact member of the timing switch by the eccentric pin 10 through rotation of the setting lever 7. In FIG. 2, the timing switch 47 is connected in parallel with a condenser C of a delay circuit and is connected in series with a power source S, a CdS resistance $R_p$ and an adjusting resistance $R_c$. Contacts of the resistance and the capacitor are connected to the base of a first transistor $T_{r1}$. The collector of the first transistor $T_{r1}$ is connected to the positive side of a power source S through a resistor and to a base of a second transistor $T_{r2}$. The collector of the second transistor $T_{r2}$ is connected to the positive side of a power source through an operating coil of an electromagnet 46. The emitters of the two transistors $T_{r1}$ and $T_{r2}$ are connected to the negative side of the power source S through a resistor.

With the construction as described when the release lever 1 is pushed downward to effect an exposure, the power source switch 48 is closed and the operating projection 4 depresses the arm 38 of the setting lever 35 of the drive cam 40, rotating it in a clockwise direction against the spring 37. The operating arm 39 recedes from the drive pin 41. The engaging surface 44 of the drive cam 40 is restrained by the anchor 45 attracted by the electromagnet 46 and the drive cam 40 rests in an immovable position.

The contact of the setting edge 2 of the release lever 1 and the driven arm 12 of the setting lever 7 is opened. The setting lever 7 moves slightly but does not initiate rotation since the engaging pawl 17 of the adjusting lever 14 in contact with the setting lever 7, by means of a shaft 8 and an eccentric pin 10, engages with an engaging member 21 of the lever 18.

By further depression of the release lever 1 the release projection 3 contacts the engaging lever 18, rotating it in a clockwise direction, and interrupts the engagement of the engaging pawl 17 and the engaging member 21 so that the adjusting lever 14 initiates rotation in a clockwise direction effected by a spring 9 about the shaft 8 together with the setting lever 7. The pin 27 of the first wheel 22 of the governor follows the clockwise rotation of the operating arm 13 and the wheel 22 in turn starts to rotate in a clockwise direction at a speed adequately controlled by the anchor 24. Upon initiation of the rotation, the eccentric pin 10 of the setting lever 7 releases the timing switch 47 and the capacitor C is charged with a current corresponding to the values of the CdS resistance $R_p$ and the adjusting resistance $R_c$.

Because of the rotation of the first wheel 22, the ring lever 29 rotates in a clockwise direction by a cam surface 31 engaged with the pin 27 while being restrained of movement. The pin 33 follows the engaging arm 32 in movement and the shutter ring rotates in a counterclockwise direction. The sector 6 then rotates and after a definite angle of rotation the shutter starts opening.

When the voltage charge on the condenser C reaches a predetermined voltage the first transistor $T_{r1}$, which was blocked is then rendered conductive so that the second transistor $T_{r2}$, which was conductive becomes nonconductive and interrupts the current to the electromagnet 46. As a consequence, the surface 44 of the drive cam 40 is released from the anchor 45 and the drive cam 40 starts to rotate instantly in a counterclockwise direction by the force of the spring 43. The drive pin 41 strikes the arm 34 of the ring lever 29 and rotates the arm 34 in a counterclockwise direction. The arm 32 depresses the pin 33 of the shutter ring and the sector 6 starts to close instantly to thereby terminate the exposure.

In the above operation, if the delay time between opening of the timing switch 47 and the opening of the sector does not comply with the delay time between the interruption of the current of the electromagnet 46 and initiation of the closing movement of the sector 6, there would arise lack of coincidence between the exposure time corresponding to the brightness of an object and the exposure time in which the sector actually opens.

According to the present invention, the relative phase between the engaging pawl 17 of the adjusting lever 14 and the operating arm 13 of the setting lever 7 can be adjusted in relation to the rotation of the eccentric pin 10 on the setting lever 7 and the adjustment is made independently of the particular time period during which the shutter is to be maintained open. It is thus possible to adjust the starting position of the movable, operating arm 13 or first wheel 22 relative to the constant starting position of the engaging pawl 17 of the adjusting lever 14 engaging with the member 21 of the engaging lever 18. Therefore, it is possible to adjust the starting position of the sector 6 and the time in which the sector 6 actually opens after starting and thereby correct the delay time of the two members in agreement as shown by chain lines in FIG. 3b. At this time, the first wheel 22 is subjected to braking of the anchor 24 through the gear 23 so that it is capable of obtaining a correction of the delay time extremely broadly and accurately corresponding to any slight adjustment of the starting position of the first wheel 22.

Moreover, when depression of the release lever 1 is stopped and the lever released, the release lever 1 rises by means of the spring 5. The setting edge 2 presses the driven arm 12 of the setting lever 7 rotating the lever 7 in a counterclockwise direction against the spring 9, and charges the first wheel in the previous position so that the drive cam 40 rotates in a clockwise direction against the spring 43, by the setting lever 35 and is set in the previous position.

The invention hereinbefore described has a construction and functions such that the adjusting resistance $R_c$ is not required to be a variable resistor inserted in series with the CdS resistance $R_p$. The value of the resistance of this resistor is adjusted in response to the difference of the delay time of each shutter to correct its difference to 0. The adjusting resistor $R_c$ may be fixed in value whereby a constant predetermined time period is obtained or it may on occasions not be used and correction can be made simply and accurately and completely in a wider range relative to the delay in the opening time whether such delay at the closing time may be large or small.

I claim:

1. In a camera having a shutter; shutter-actuating means including a movable trigger lever for effecting both opening of said shutter in response to movement of said trigger lever in one direction and then closing of said shutter; electric delay means including a timing switch actuated during movement of said trigger lever in said one direction for maintaining said shutter open a predetermined time period after actuation of said timing switch; and adjusting means for selectively adjusting the time duration between the actuation of said timing switch and the actual opening of said shutter independently of said predetermined time period.

2. A camera according to claim 1; wherein said adjusting means comprises means cooperative with said shutter-actuating means for adjusting the position of said shutter relative to said timing switch.

3. A camera according to claim 2; wherein said last-mentioned means comprises a pair of relatively movable levers, and means for selectively adjusting the relative position of said pair of levers to accordingly effect adjustment of the position of said shutter relative to said timing switch.

4. A camera according to claim 3, wherein said pair of movable levers are superimposed one upon the other and one of said levers has means therein defining a groove, and wherein said means for selectively adjusting the relative position of said pair of levers comprises an eccentric pin adjustably connected to the other of said levers extending into said groove and engaging with said one lever whereby adjustment of said eccentric pin effects relative movement of said pair of movable levers.

5. An exposure control mechanism for an electrically controlled photographic shutter comprising: displaceable release means for effecting opening of the shutter, electric delay means for maintaining the shutter open a predetermined time period, a timing switch actuated in response to displacement of said release means to effect energization of said electric delay means, shutter closing means operable by said electric delay means to effect closing of the shutter, and adjusting means for selectively adjusting the starting position of the shutter so as to alter the time interval between actuation of said switch and the actual opening of the shutter, whereby said time interval may be adjusted to compensate for the time delay between the operation of the electric delay means and the actual closing of the shutter.

6. An exposure control mechanism according to claim 5, wherein said adjusting means includes a governor effective to variably adjust the starting position of the shutter.

* * * * *